UNITED STATES PATENT OFFICE.

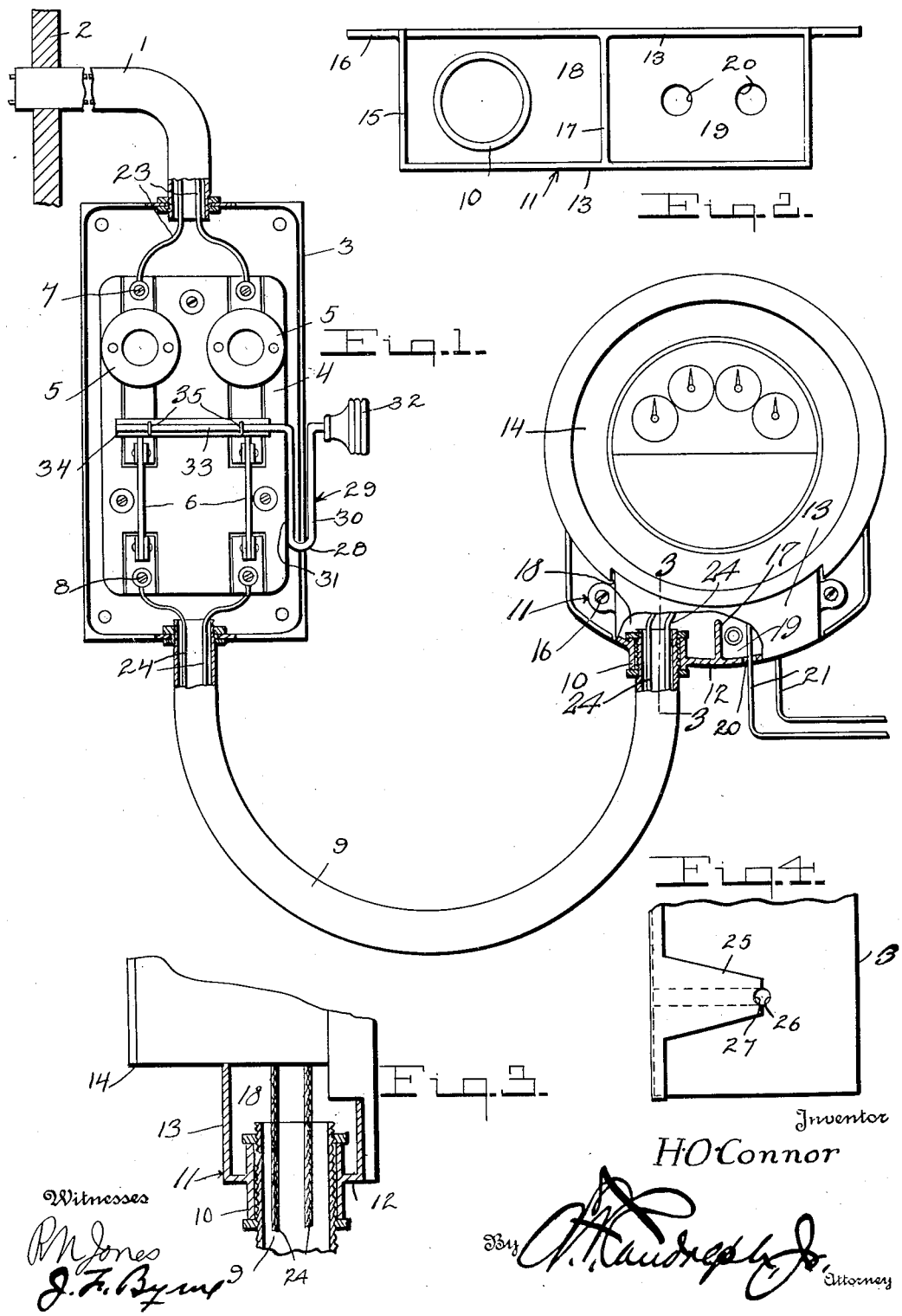

HARRY O'CONNOR, OF PORT HURON, MICHIGAN.

SWITCH-BOX.

1,237,807. Specification of Letters Patent. Patented Aug. 21, 1917.

Application filed September 10, 1915. Serial No. 50,063.

*To all whom it may concern:*

Be it known that I, HARRY O'CONNOR, a citizen of the United States, residing at Port Huron, in the county of Saint Clair and State of Michigan, have invented certain new and useful Improvements in Switch-Boxes; and I do hereby declare the following to be a full, clear, and exact description of the invention, such as will enable others skilled in the art to which it appertains to make and use the same.

This invention relates to new and useful improvements in switch boxes and the principal object of the device is to provide a means to prevent persons from connecting into an electric circuit before the passage of the current through a meter.

Another object of the invention is to provide a device which will effectively protect electric power companies against the expense of current by persons connecting in on the circuit at a point prior to the passage of the current through the meter.

Still another object of the invention is to provide a novel means for controlling the switch and also to provide a novel means for connecting the conduit leading from the switch box to the meter in place with the cap of the meter.

With these and other objects in view, the invention consists in the novel combination and arrangement of parts as will be fully set forth in the following specification and accompanying drawings, in which:

Figure 1 is a view illustrating my improved guard.

Fig. 2 is a plan view of the meter cap.

Fig. 3 is an enlarged detail sectional view on line 3—3 of Fig. 1 showing the method of connecting the conduit to the meter cap, and Fig. 4 is a fragmentary detail side elevation of the lower end of the switch box.

Referring now to the drawings by characters of reference, the numeral 1 designates the inlet conduit leading through the wall 2 of the building and the inner end of this conduit is bent downwardly and extends into the switch and fuse box 3. This switch and fuse box carries the usual insulating fuse and switch block 4 provided with the usual fusee 5 and the switch bars 6. This switch block 4 is also provided with the binding post or connection 7 for the inlet side and the binding post or connection 8 for the outlet side. A semicircular conduit 9 leads from the outlet side of the box and its opposite end is threaded to connect into the internally threaded sleeve 10 carried on the meter cap which will be more fully hereinafter described. It is to be understood that the semi-circular conduit 9 is connected to the switch box by threading, or any other suitable connection which will prevent unauthorized persons from removing the same.

The meter cap above referred to is designated by the numeral 11 and comprises the arcuate bottom wall 12 provided with the side walls 13 which conform to the shape of the bottom wall and the upper edges of these side walls are curved to conform to the curvature of the meter 14. The side walls are connected to the bottom walls by means of the end walls 15 and one of the side walls is formed with a pair of oppositely disposed ears 16 having apertures formed therein for the reception of screws by means of which the cap is secured in place. A central partition wall 17 separates the cap into an inlet chamber 18 and an outlet chamber 19, and the bottom wall 12 in the inlet chamber side is formed with the opening in which the sleeve 10 is positioned. Suitable outlet openings 20 are formed in the outlet side or chamber 19 and through these openings 20 pass the wires 21 which lead to the various points in the building at which the current is consumed. The feed wires 23 are carried into the building through the conduit 1 and are connected to the binding screws 7 and the wires connecting the switch blocks with the meters which are designated by the numeral 24 are carried to the conduit 9 and connected to the meter. It will thus be seen that the wires leading into the switch block and to the meter are so protected as to prevent any person from getting into the circuit before the same has passed through the meter.

In order to close the switch box and frustrate any attempt to cut into the circuit at this point, there is provided a suitable cover which is sealed in place and provided with a suitable arm 25 which covers a slot 26 formed in one side of the box. The end of this arm is provided with a notch or semicircular recess 27 and this notch together with the end of the slot 26 forms a journal bearing for the bight portion 28 of the switch operating crank designated generally by the numeral 29. This switch operating crank comprises the bight portion 28, having formed thereon the outer arm 30 and the inner arm 31 and the outer is provided at its upper end with a suitable knob 32 while the inner arm terminates at its upper end, the angular extension 33, which is secured to a suitable transverse insulating bar 34 by means of the staples or eyes 35. This transverse insulating bar 34 forms the connecting bar between the free ends of the switch arm 6 and it will thus be seen that when the knob 32 is moved the switch may be manipulated and thrown into on or off position.

It will be apparent from the foregoing that in use, when the box is closed and sealed, the bight portion 28 of the crank arm 29 will be held in position so that the switch may be thrown into on or off position by the manipulation of the knob 32. It will also be seen that the wires are protected so that any attempt to cut in on the circuit before the same is passed through the meter will be frustrated, thus insuring the company supplying the current of an accurate measurement of the amount of current used.

While in the foregoing there has been shown and described the preferred embodiment of this invention, it is to be understood that such changes may be made in the combination and arrangement of parts as will fall within the spirit and scope of the appended claim.

What is claimed is:

A service box comprising a bottom, side and end walls formed on the bottom and extending at right angles therefrom to provide a box like structure, one of the side walls being provided with a slot extending from its free edge to a point intermediate the free edge and the bottom of the box, a switch block within the box, a switch blade pivoted to the switch block and arranged with the axis of the pivot in alinement with the bottom of the slot in the side wall of the box, an insulating head on said switch blade, an eye carried by the insulating head, an arm rotatably mounted in the eye, a U-shaped arm formed at right angles to the first mentioned arm, the bight portion of the U-shaped arm being rotatably mounted in the bottom of the slot and arranged with one of its legs on the inside and the other of its legs on the outside of the box, a knob at the end of the arm of the U-shaped arm which is disposed on the outside of the box, a cover for said box and a notched tongue formed integrally with one side edge of the cover and adapted to close the slot in the side wall of the box, the notch in said tongue being adapted to coöperate with the bottom wall of the slot to provide a bearing for the U-shaped arm.

In testimony whereof I affix my signature in presence of two witnesses.

HARRY O'CONNOR.

Witnesses:
 FRANK O'HARA,
 B. J. WELLMAN.